No. 720,278. PATENTED FEB. 10, 1903.
D. E. NORTON.
PROPELLING GEAR FOR CYCLES.
APPLICATION FILED SEPT. 2, 1902.
NO MODEL.
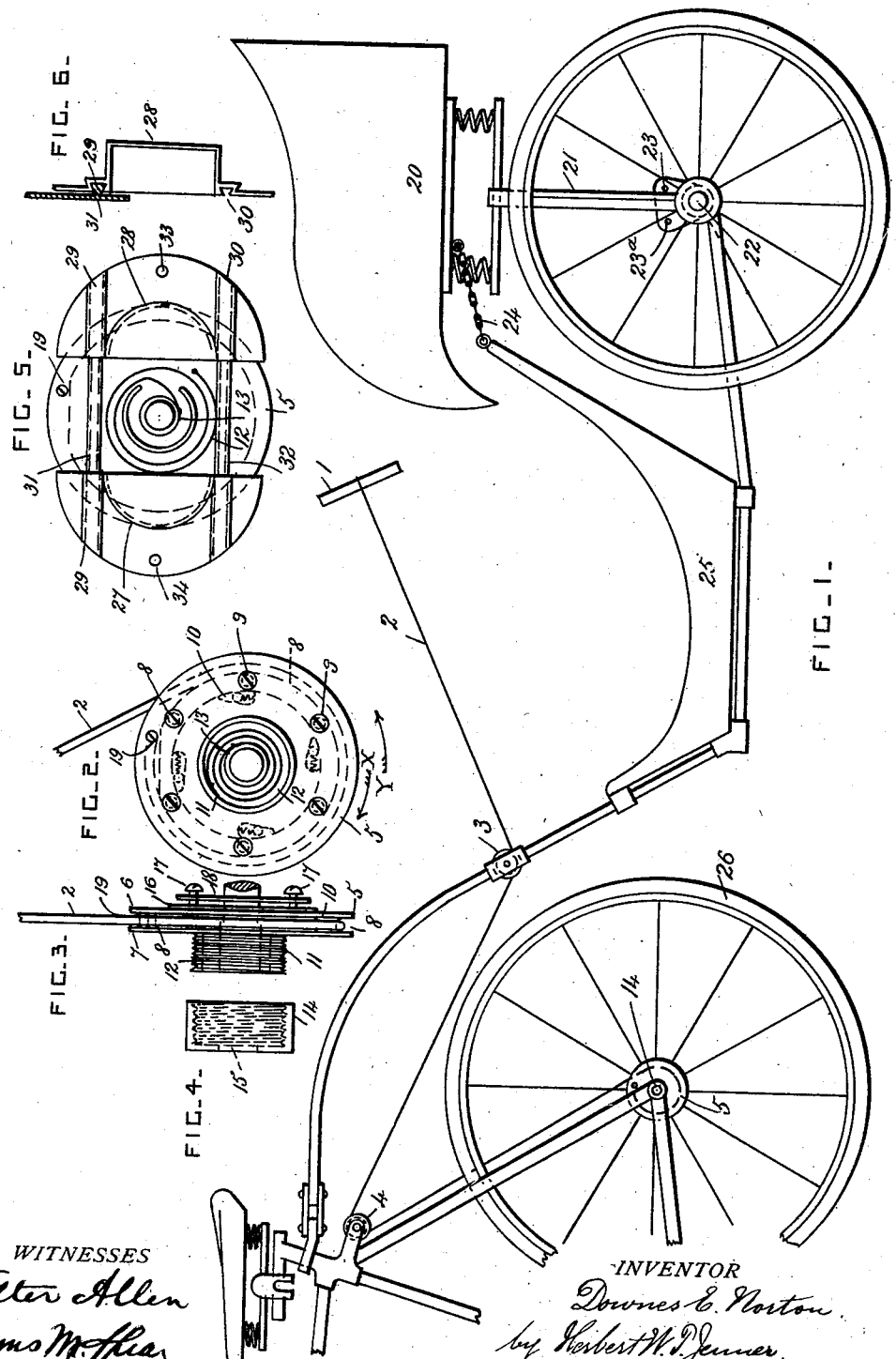
WITNESSES
Walter Allen
James M. Shea
INVENTOR
Downes E. Norton
by Herbert W. T. Jenner
Attorney

UNITED STATES PATENT OFFICE.

DOWNES ELLAND NORTON, OF HAMPTON HILL, ENGLAND.

PROPELLING-GEAR FOR CYCLES.

SPECIFICATION forming part of Letters Patent No. 720,278, dated February 10, 1903.

Application filed September 2, 1902. Serial No. 121,915. (No model.)

*To all whom it may concern:*

Be it known that I, DOWNES ELLAND NORTON, a subject of the King of Great Britain and Ireland, residing at Laurel Dene, Hampton Hill, in the county of Middlesex, England, have invented new and useful Improvements in and Relating to Propelling-Gear for Cycles, Boats, and other Vehicles, of which the following is a specification.

This invention relates to gear for propelling cycles, cycle-trailers, boats, and other vehicles; and it consists in manually-actuated gear which is of simple construction, efficient in action, and easily applicable to existing vehicles.

The accompanying drawings illustrate my invention.

Figure 1 is an elevation of my invention in connection with a bicycle and a cycle-trailer. Fig. 2 is a front elevation of the combined spring-drum and ratchet driving-gear hereinafter described. Fig. 3 is a side or edge view of Fig. 2. Fig. 4 is a side view of the cap adapted to be screwed on or otherwise attached to the combined spring-drum and ratchet driving-gear, as hereinafter described. Figs. 5 and 6 are respectively a front and a part side view of a modified construction of the spring-drum and ratchet driving-gear hereinafter referred to.

The same numerals indicate the same or equivalent parts in the several figures of the drawings.

In one application of my invention to a cycle-trailer (which, as is well-known, is a light vehicle or kind of bath-chair which may be attached at the rear of a bicycle or tricycle) I provide a cross-bar or operating-handle 1, to which one end of a flexible connection 2 is attached, said connection being led over a pulley 3 on the front frame or leading-bar of the trailer and a pulley 4 on the rear part of the cycle-frame, the other end of the flexible connection being attached to a spring drum or pulley 5, which forms part of a ratchet or friction driving-clutch (see Fig. 2,) mounted on the rear wheel of the cycle, so that the occupant or occupants of the trailer by moving to and fro the aforesaid handle 1 will by means of the flexible connection 2 to said combined spring drum or pulley and driving-clutch 5 assist in propelling the cycle as well as the trailer, said pulley taking up the slack of said flexible connection. When not driving by hand, as above described, the spring drum or pulley keeps the flexible connection 2 taut and the driving-clutch acts like a free-wheel clutch.

Another feature of my invention consists in pivotally mounting the spring-supported seat of the trailer on its support, (axle or framework,) so as to give a swinging or seesaw action to the occupant's body when assisting the driving, as above described.

Referring to Figs. 1, 2, 3, and 4, which illustrate the combined spring drum or pulley and ratchet of free-wheel driving-gear, according to this construction the device 5 consists of the two side plates 6 and 7, (see Fig. 3,) which are attached to the pulley ring or face 8—for instance, by the screws 9. (See Fig. 2.) 10 is a spring-and-ball friction-clutch, which is of well-known construction and is fitted in the pulley concentric with the ring 8. A hollow boss or flange 11 (see Fig. 3) is formed or provided on the side plate 7, and inside said boss 11 is fitted the coiled spring 12, one end of which is attached to a hook or projection on the boss or flange 11, (or otherwise fastened thereto,) the other end of said spring being fastened to a sleeve or collar 13, fixed onto the spindle of the bicycle-wheel. The sleeve 13 may be detachably fixed on the wheel to be driven. 14, Fig. 4, is the cap adapted to be screwed onto boss 11 on the pulley, so as to inclose the spring 12. A central hole or opening 15 is provided in cap 14, through which the end of the spindle of the cycle or other wheel may project. 16 is a ring, which is attached to one side of the friction-clutch 10 by means of screws 17 or otherwise. The screws 17 also serve to hold in place a retaining-ring 18, Fig. 2, which may also serve to attach the complete spring-drum and friction-clutch or ratchet driving mechanism to the hub of the wheel. 19 is a small screw or pin by means of which one end of the flexible connection 2 is attached to the pulley.

Referring now to Fig. 1, the spring-supported seat 20 of the cycle-trailer is mounted on an upright or uprights 21, whose lower ends bear loosely on the axle 22 of the trailer-wheels, so that the upright or support 21 and the seat 20 may have an oscillating or to-and-fro movement on the axle, a pair of stops 23 23ª being fixed on the axle 22, so as to limit the oscillating movement of the supports 21. The oscillating or swinging movement provided by the arrangement just described permits greater power being exerted by the occupant of the trailer in pulling the driving connection 2 than if the seat were immovably fixed on or with reference to the axle 22. The chain 24, connecting seat 20 with the foot-rest 25, also tends to limit the movement or oscillation of the seat. The said chain may be adjustable.

In the example shown in Fig. 1 the combined spring-drum and friction-clutch or ratchet driving-gear is fixed on one side or hub of the driving-wheel 26 of the bicycle, the usual chain-wheel (which may be a free wheel) being on the other side or hub of said driving-wheel; but, if desired, the usual chain-wheel on the rear or driving wheel of the bicycle might be attached to the same side of driving-wheel 26 as the combined spring-pulley and clutch, or said chain-wheel might be mounted on the combined spring drum or pulley 5 in connection with the friction-clutch 10 or equivalent driving-gear.

In the modification of the combined spring drum or pulley and driving-clutch 5 shown in Figs. 5 and 6 the details of the driving-clutch are not shown; but this clutch may be a friction-clutch similar to that marked 10 in Fig. 2. The object of the construction shown in Figs. 5 and 6 is to enable the spring 12 to be readily examined, renewed, or replaced, and for this purpose said spring is arranged on the outside of the flange or boss 11, and the cap or cover is formed of two parts 27 and 28, each having grooves 29 and 30, adapted to engage, respectively, ribs 31 and 32 on the outside of the pulley 5, so that the two parts 27 and 28 may be moved to meet each other, so as to form a complete cover for spring 12. The parts 27 and 28 when joined up to form the complete cover may be held against displacement by a couple of small screws inserted through holes 33 and 34 in the cover.

A rest or stop may be provided on the trailer for supporting the handle 1 when the auxiliary driving by the occupant of the trailer is not required.

In lieu of providing the combined spring drum or pulley and driving-clutch 5 on the cycle-wheel it may be fitted on the trailer-wheel or axle.

Normally when the handle 1 is in the position of rest one end of the flexible connection 2 is wound around the drum or pulley face 8, Fig. 3, and is kept so wound by the action of the spring 12 on pulley, so that the connection between the combined spring drum or pulley and driving-clutch 5 and the handle 1 is always kept taut. In this condition the friction-clutch 10, which is rigidly connected to the bicycle-wheel, is free to revolve in the pulley in the direction of the arrow X, Fig. 2, so that the bicycle may be driven in the ordinary way. Now if the occupant of the trailer desires to assist the propulsion he does so by giving a pull on handle 1 and connection 2, whereby the pulley-ring 8, and with it the clutch 10 and the wheel to which said clutch is fixed, will be revolved or assisted to revolve in the driving direction, (indicated by the arrow Y in Fig. 2.) When the limit of the pull on the connection 2 is reached, the operator relieves the tension on said connection by a forward movement, so that spring 12, acting on drum or pulley ring 8, causes said pulley to revolve in the direction of arrow X, Fig. 2, thus rewinding or taking up the slack of the flexible connection ready for the next pull on handle 2. The rocking action of the trailer-seat 20 on the axle 22 facilitates the operation of the driving connection 2 and allows a maximum of force to be exerted by the occupant of the trailer, as before mentioned.

The action of the combined spring drum or pulley and driving-clutch 5 hereinbefore referred to with reference to Figs. 5 and 6 is identical to that above described with reference to Figs. 1 and 2.

What I claim is—

1. The combination, with a propelling or driving wheel, of a combined spring-pulley and driving-clutch operatively connected with the said wheel, a flexible driving connection for revolving the said pulley and wheel, a support pivoted at its lower end, a seat secured to the upper end of the said support, and stops for limiting the oscillations of the said support and seat, substantially as set forth.

2. The combination, with a cycle provided with driving mechanism and a driving-wheel, of a trailer-carriage provided with an axle and wheels and connected to the frame of the said cycle, a support having its lower end pivoted to the said axle, a seat secured to the upper end of the said support, stops limiting the oscillations of the said support and seat, and auxiliary driving mechanism comprising a combined spring-pulley and driving-clutch operatively connected with the said driving-wheel, and a flexible connection for revolving the said pulley and driving-wheel, substantially as set forth.

In testimony whereof I have signed my name to this specification in the presence of two subscribing witnesses.

DOWNES ELLAND NORTON.

Witnesses:
 JNO. M. P. CRAVEN,
 J. GROONY.